United States Patent
Li

(10) Patent No.: US 12,192,922 B2
(45) Date of Patent: Jan. 7, 2025

(54) DATA COMMUNICATIONS METHOD AND APPARATUS

(71) Applicant: HUAWEI TECHNOLOGIES CO., LTD., Shenzhen (CN)

(72) Inventor: Yanchun Li, Boulogne Billancourt (FR)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 762 days.

(21) Appl. No.: 17/202,597

(22) Filed: Mar. 16, 2021

(65) Prior Publication Data
US 2021/0204233 A1 Jul. 1, 2021

Related U.S. Application Data

(63) Continuation of application No. PCT/CN2019/106063, filed on Sep. 17, 2019.

(30) Foreign Application Priority Data

Sep. 17, 2018 (CN) .......................... 201811080226.1

(51) Int. Cl.
*H04L 5/00* (2006.01)
*H04W 56/00* (2009.01)
(Continued)

(52) U.S. Cl.
CPC ......... *H04W 56/001* (2013.01); *H04L 5/0048* (2013.01); *H04W 72/046* (2013.01)

(58) Field of Classification Search
CPC ..... H04L 5/0048; H04J 3/0602; H04J 3/0617; H04W 56/001; H04W 72/046; H04W 72/12
See application file for complete search history.

(56) References Cited

U.S. PATENT DOCUMENTS

7,574,224 B2 * 8/2009 Lane ................. H04W 56/0005
455/208
7,974,261 B2 * 7/2011 Lane .................... H04B 7/2125
370/328
(Continued)

FOREIGN PATENT DOCUMENTS

CN 104969588 A 10/2015
CN 105517157 A 4/2016
(Continued)

OTHER PUBLICATIONS

IEEE P802.11ax /D2.2, Feb. 2018, Draft Standard for Information technology—Telecommunications and Information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN. 620 pages.
(Continued)

*Primary Examiner* — Alpus Hsu
(74) *Attorney, Agent, or Firm* — Rimon PC

(57) ABSTRACT

This application provides a data communications method and apparatus. The method includes: A first station (STA) receives time adjustment information, where the time adjustment information is used to indicate a sending moment at which a signal is sent by using each of at least two beams. The first STA may send data at a corresponding sending moment based on the time adjustment information using a corresponding beam. In this way, an access point (AP) can (Continued)

simultaneously receive data sent by one station using at least two beams. This ensures data validity and improves data communication efficiency.

9 Claims, 11 Drawing Sheets

(51) Int. Cl.
*H04W 72/04* (2023.01)
*H04W 72/044* (2023.01)

(56) References Cited

U.S. PATENT DOCUMENTS

| | | | | |
|---|---|---|---|---|
| 8,036,205 | B2* | 10/2011 | Lane | H04W 56/00 370/328 |
| 8,406,795 | B2* | 3/2013 | Lane | H04W 56/0005 455/208 |
| 9,648,573 | B2* | 5/2017 | Siomina | H04W 24/08 |
| 9,894,707 | B2* | 2/2018 | Chang | H04W 76/28 |
| 10,098,091 | B2* | 10/2018 | Seol | H04W 72/04 |
| 10,333,594 | B2* | 6/2019 | Jung | H04B 7/0452 |
| 2021/0084657 | A1* | 3/2021 | Hashemi | H04W 56/001 |
| 2021/0119686 | A1* | 4/2021 | Tang | H04B 7/0695 |
| 2021/0266056 | A1* | 8/2021 | Hashemi | H04B 7/0695 |

FOREIGN PATENT DOCUMENTS

| | | |
|---|---|---|
| CN | 107734663 A | 2/2018 |
| CN | 107925605 A | 4/2018 |
| CN | 108024325 A | 5/2018 |
| CN | 108377559 A | 8/2018 |
| EP | 3200498 A1 | 8/2017 |
| KR | 20100084116 A | 7/2010 |
| WO | 2018014830 A1 | 1/2018 |

OTHER PUBLICATIONS

IEEE P802.11ay /D2.0, Jul. 2018, Draft Standard for Information Technology—10 Telecommunications and Information Exchange 11 Between Systems—Local and Metropolitan Area 12 Networks—Specific Requirements—Part 11: Wireless 13 LAN Medium Access Control (MAC) and Physical Layer 14 (PHY) Specifications-15, Amendment 7: Enhanced throughput for operation in 16 license-exempt bands above 45 GHZ, 673 pages.

* cited by examiner

| Quantity of beams | Sending moment at which a signal is sent by using a beam 0 | Sending moment at which a signal is sent by using a beam 1 | ... | Sending moment at which a signal is sent by using a beam i | Index of the beam 0 | Index of the beam 1 | ... | Index of the beam i |

FIG. 4

| Quantity of beams | Index of a beam 0 | Index of a beam 1 | ... | Index of a beam i | Time offset of the beam 0 | Time offset of the beam 1 | ... | Time offset of the beam i |

FIG. 5

| BRP MIMO feedback | Feedback type | Time adjustment information field |
|---|---|---|

FIG. 7

DATA COMMUNICATIONS METHOD AND APPARATUS

CROSS-REFERENCE TO RELATED APPLICATIONS

This application is a continuation of International Application No. PCT/CN2019/106063, filed on Sep. 17, 2019, which claims priority to Chinese Patent Application No. 201811080226.1, filed on Sep. 17, 2018. The disclosures of the aforementioned applications are hereby incorporated by reference in their entireties.

TECHNICAL FIELD

This application relates to the communications field, and more specifically, to a data communications method and apparatus.

BACKGROUND

In a wireless local area network (WLAN) system, a data communication procedure is usually as follows: An access point (AP) sends a trigger frame; a station (STA) receives the trigger frame, and after a short interframe space (SIFS) time, sends an uplink physical protocol data unit (PPDU) based on an indication of the trigger frame; after receiving the PPDU, the AP replies with an acknowledgement (ACK). The trigger frame is a control frame, the control frame includes a guard interval (GI) indicated by a time period, and the GI is used to describe a maximum value of a time difference (time offset) that can be tolerated by the AP and that is between arrivals, at a receive end, of signals transmitted by using different beams.

In a high-frequency 60 GHz system, a user device usually needs to perform data communication by using different analog beams, to reduce interference between beams. However, in the high-frequency 60 GHz system, a bandwidth is large, and symbol duration of a modulation symbol is short, or duration of a synchronization symbol or a reference signal is short. Consequently, a tolerance range of time misalignment for the data communication performed by using different beams is small. Consequently, when a time difference (time offset) between arrivals, at the receive end, of signals transmitted by using a plurality of beams is greater than the guard interval GI (that is, exceeds the tolerance range), signal reception at the receive end is affected, and data communication efficiency is relatively low.

SUMMARY

This application provides a data communications method and apparatus, to help improve data communication efficiency.

According to a first aspect, a data communications method is provided. The method includes: A first station receives time adjustment information, where the time adjustment information is used to indicate a sending moment at which a signal is sent by using each of at least two beams, the at least two beams are beams corresponding to at least one station, and the first station is any station of the at least one station. The first station sends, based on the time adjustment information, data by using a beam that belongs to the first station and that is in the at least two beams.

The first STA receives the time adjustment information, where the time adjustment information is used to indicate the sending moment at which the signal is sent by using each of at least two beams, and may send the data at a corresponding sending moment based on the time adjustment information by using the corresponding beam. In this way, an AP can simultaneously receive data sent by the at least one station by using the at least two beams. This ensures data validity and improves data communication efficiency.

In some possible implementations, the time adjustment information includes a time offset of a sending moment at which a signal is sent by using the first beam relative to a preset moment, and a time offset of each beam in beams, other than the first beam, in the at least two beams relative to the sending moment of the first beam.

The sending moment at which the signal is sent by using the first beam may also be configured by using the time adjustment information. The time adjustment information further includes a time offset of the sending moment at which the first station sends the signal by using the first beam. In this way, the first station learns of, based on the time adjustment information, the sending moment at which the signal is sent by using the first beam. In this way, the at least one station sends data by using a corresponding beam at a proper time, and data sent by using different beams can simultaneously arrive at the access point. This ensures effectiveness of data communication and improves the data communication efficiency.

In some possible implementations, the time adjustment information includes a time offset of a sending moment at which a second station in the at least one station sends a signal relative to a preset moment, and a time offset of the sending moment at which the signal is sent by using each of the at least two beams relative to the sending moment at which the second station sends the signal.

The time adjustment information carries the time offset of the sending moment at which the second station sends the signal relative to the preset moment. In this way, the first station can learn of the sending moment at which the second station sends the signal. The time adjustment information further carries the time offset of each of the at least two beams relative to the sending moment at which the second station sends the signal. In this way, the first station may learn of, based on the sending moment at which the second station sends the signal, the sending moment at which the signal is sent by using each beam. Therefore, the first station can send the data by using the corresponding beam at a proper moment, to ensure alignment of data that arrives at the access point and that is sent by using different beams, in other words, ensure effectiveness of data communication, and improve the data communication efficiency.

In some possible implementations, the method further includes: The first station receives first configuration information, where the first configuration information is used to indicate the at least two beams. The first station receives second configuration information, where the second configuration information is used to trigger the first station to send a reference signal. The first station sends the reference signal based on the second configuration information by using a beam that is in the at least two beams and that belongs to the first station, where the reference signal is used by an access point to determine sending moments at which signals are sent by using the at least two beams.

The first configuration information may directly indicate the at least two beams, or may indicate the at least two beams on a per-sector basis, and each sector includes at least one beam. In other words, the first STA receives the first configuration information, and sends the reference signal on a beam configured by the AP to perform time offset measurement (the process may be referred to as time measurement training or beam training). In this way, the STA configures the beam specified by the AP, and performs the time offset measurement and data transmission on the beam specified by the AP. This can reduce interference between uplink spatial streams, improve transmission efficiency, and ensure communication quality. In addition, the second configuration information is used to trigger the station to send the reference signal used for time measurement. To be specific, after receiving the second configuration information, the first STA immediately starts an operation of sending the reference signal. For example, starting the operation of sending the reference signal may be preparing to send the reference signal after a time interval.

In some possible implementations, the first configuration information and the second configuration information are carried in a same multi-beam configuration frame. The first configuration information and the second configuration information are simultaneously sent. Compared with separate sending, this reduces signaling overheads.

In some possible implementations, the first configuration information and the second configuration information received by the first station may be separately sent. That is, antenna mode setting and the time measurement are separately configured. To be specific, the first station may perform uplink beam training after completing the antenna mode setting. By using a time interval shorter than a trigger frame, a time interval for measuring a time offset may be reduced, so that a data communication delay is reduced.

In some possible implementations, that the first station receives first configuration information includes: The first station receives a request to send RTS frame, where the RTS frame includes the first configuration information. Alternatively, the first station receives a confirm to send CTS frame, where the CTS frame includes the first configuration information. In this way, the first configuration information is carried in the RTS frame or the CTS frame, so that separate sending of the configuration information can be avoided, and signaling overheads are reduced.

In some possible implementations, that a first station receives time adjustment information includes: The first station receives a beam refinement protocol BRP feedback frame, where the BRP feedback frame includes a newly added field, and the newly added field is used to indicate the time adjustment information. In this way, the BRP feedback frame in an existing protocol is slightly modified to indicate the time adjustment information, so that overheads are reduced, and compatibility is improved.

In some possible implementations, the method further includes: The first station receives trigger information, where the trigger information is used to trigger the first station to send a signal. That the first station sends, based on the time adjustment information, data by using a beam that belongs to the first station and that is in the at least two beams includes: The first station sends, based on the time adjustment information and the trigger information, the data by using the beam that is in the at least two beams and that belongs to the first station. That is, after receiving the time adjustment information, the first STA learns of time offsets of sending moments at which signals are sent by using different beams, and the first STA may further send the data after receiving the trigger information.

In some possible implementations, the time adjustment information and the trigger information are carried in a same multi-beam feedback frame. The trigger information is used to trigger the first STA to send the data. The time adjustment information and the trigger information may be carried in the multi-beam feedback frame. The AP may consecutively track and adjust time offsets of the at least two beams, so that the data communication efficiency is further improved.

According to a second aspect, a data communications method is provided. The method includes: An access point sends time adjustment information to at least one station, where the time adjustment information is used to indicate a sending moment at which a signal is sent by using each of at least two beams, and the at least two beams are beams corresponding to the at least one station. The access point receives data sent by the at least one station based on the time adjustment information by using the at least two beams.

The access point sends the time adjustment information to the at least one station, so that each station determines, based on the time adjustment information, a sending moment at which a signal is sent by using a beam that belongs to the station and that is in at least two beams. In this way, the access point may simultaneously receive data that is sent by each station at a corresponding sending moment based on the time adjustment information by using a corresponding beam, so that the AP can simultaneously receive the data sent by the at least one station by using the at least two beams. This ensures data validity and improves data communication efficiency.

In some possible implementations, the time adjustment information includes a first time offset of a sending moment at which a signal is sent by using a first beam in the at least two beams relative to a preset moment, and a time offset of a sending moment at which a signal is sent by using each beam in beams, other than the first beam, in the at least two beams relative to the sending moment at which the signal is sent by using the first beam.

The access point configures the time adjustment information for each beam, so that the first station can learn of, based on the preset moment and the time offset of the sending moment at which the signal is sent by using the first beam relative to the preset moment, the sending moment at which the signal is sent by using the first beam, and send data at a proper time by using a corresponding beam. The access point simultaneously receives data sent by using different beams, so that effectiveness of data communication is ensured, and the data communication efficiency is improved.

In some possible implementations, the time adjustment information includes a time offset of a sending moment at which a second station in the at least one station sends a signal relative to a preset moment, and a time offset of the sending moment at which the signal is sent by using each of the at least two beams relative to the sending moment at which the second station sends the signal.

The time adjustment information carries the time offset of the sending moment at which the second station sends the signal relative to the preset moment, so that the station can learn of the sending moment at which the second station sends the signal. The time adjustment information further carries a time offset of a sending moment of each of the at least two beams relative to the sending moment at which the second station sends the signal, so that the station can learn of, based on the sending moment at which the second station sends the signal, the sending moment at which a signal is sent by using each beam. Therefore, each station can send data by using a corresponding beam at a proper moment, and the access point simultaneously receives data sent by using different beams. This ensures effectiveness of data communication and improves the data communication efficiency.

In some possible implementations, the method further includes: The access point sends first configuration information, where the first configuration information is used to indicate the at least two beams. The access point sends second configuration information, where the second configuration information is used to trigger a station to send a reference signal. The access point receives the reference signal. The access point determines, based on the reference signal, sending moments at which signals are sent by using the at least two beams.

The first configuration information may directly indicate the at least two beams, or may indicate the at least two beams on a per-sector basis, and each sector includes at least one beam. In other words, the access point sends the first configuration information, and each station sends the reference signal on a beam configured by the AP to perform time offset measurement (the process may be referred to as time measurement training or beam training). In this way, each station configures the beam specified by the AP, and performs the time offset measurement and data transmission on the beam specified by the AP. This can reduce interference between uplink spatial streams, improve transmission efficiency, and ensure communication quality. In addition, the second configuration information is used to trigger the station to send the reference signal used for time measurement. To be specific, after receiving the second configuration information, the first STA immediately send the reference signal.

In some possible implementations, the first configuration information and the second configuration information are carried in a same multi-beam configuration frame. The first configuration information and the second configuration information are simultaneously sent. Compared with separate sending, this reduces signaling overheads.

In some possible implementations, that the access point sends first configuration information includes: The access point sends a request to send RTS frame, where the RTS frame includes the first configuration information. Alternatively, the access point sends a confirm to send CTS frame, where the CTS frame includes the first configuration information. In this way, the RTS frame or the CTS frame carries the first configuration information. This avoids separate sending and reduces signaling overheads.

In some possible implementations, that an access point sends time adjustment information to at least one station includes: The access point sends a beam refinement protocol BRP feedback frame to the at least one station, where the BRP feedback frame includes a newly added field, and the newly added field is used to indicate the time adjustment information. In other words, the BRP feedback frame in an existing protocol is slightly modified to indicate the time adjustment information, so that overheads are reduced, and compatibility is improved.

In some possible implementations, the method further includes: The access point sends trigger information to the at least one station, where the trigger information is used to trigger each of the at least one station to send data. The AP may send the trigger information to trigger a station to send the data. In other words, the AP triggers the station to send the data when necessary. This improves flexibility of sending the data by the station.

In some possible implementations, the time adjustment information and the trigger information are carried in a same multi-beam feedback frame. The trigger information is used to trigger each STA to send the data. The time adjustment information and the trigger information may be carried in the multi-beam feedback frame. The AP may consecutively track and adjust time offsets of the at least two beams, so that the data communication efficiency is further improved.

According to a third aspect, a data communications method is provided. The method includes: A first station receives time adjustment information, where the time adjustment information includes a time offset of each beam in beams, other than a first beam, in at least two beams relative to a sending moment of the first beam. The first station sends, based on the time adjustment information, data by using a beam that belongs to the first station and that is in the at least two beams.

The time adjustment information includes the time offset of a sending moment at which a signal is sent by using the foregoing other beams relative to the sending moment at which a signal is sent by using the first beam. In this way, the first station may send a signal at any moment (for example, a first moment) by using a beam. The sending moment at which the signal is sent by using the foregoing other beams may be determined based on the first moment. In this way, at least one station sends data by using a corresponding beam at a proper time, and data sent by using different beams can simultaneously arrive at an access point. This ensures effectiveness of data communication and improves data communication efficiency.

In some possible implementations, the time adjustment information further includes a time offset of the sending moment at which the signal is sent by using the first beam relative to a preset moment.

The sending moment at which the signal is sent by using the first beam may also be configured by using the time adjustment information, and the time adjustment information includes a time offset of the sending moment at which the first station sends the signal by using the first beam. In this way, the first station can learn of, based on the preset moment and the time offset of the sending moment at which the signal is sent by using the first beam relative to the preset moment, the sending moment at which the signal is sent by using the first beam. That is, the sending moment at which the signal is sent by using the first beam may also be set by the access point. This further reduces interference between uplink spatial streams.

According to a fourth aspect, a data communications method is provided. The method includes: An access point sends time adjustment information to at least one station, where the time adjustment information includes a time offset of a sending moment at which a signal is sent by using each beam in beams, other than a first beam, in the at least two beams relative to a sending moment at which a signal is sent by using the first beam. The access point receives data sent by the at least one station based on the time adjustment information by using the at least two beams.

The time adjustment information includes the time offset of the sending moment at which the signal is sent by using the foregoing other beams relative to the sending moment at which the signal is sent by using the first beam. An access point sends the time adjustment information to the at least one station, so that a station may send a signal at any moment (for example, a first moment) by using a beam. The sending moment at which the signal is sent by using the foregoing other beams may be determined based on the first moment. In this way, the at least one station sends data at a proper time by using a corresponding beam, and the access point can simultaneously receive data sent by using different beams. This ensures effectiveness of data communication and improves data communication efficiency.

In some possible implementations, the time adjustment information further includes a first time offset of the sending moment at which the signal is sent by using the first beam in the at least two beams relative to a preset moment.

The access point may further send the time adjustment information to configure the sending moment at which the signal is sent by using the first beam, and the time adjustment information includes the time offset of the sending moment at which a first station sends the signal by using the first beam relative to the preset moment. In this way, the first station can learn of, based on the preset moment and the time offset of the sending moment at which the signal is sent by using the first beam relative to the preset moment, the sending moment at which the signal is sent by using the first beam. That is, the sending moment at which the signal is sent by using the first beam may also be set by the access point. This further reduces interference between uplink spatial streams.

According to a fifth aspect, a data communications apparatus is provided. The apparatus may be a first station, or may be a chip in a first station. The apparatus has a function of implementing each embodiment in the first aspect or the third aspect or any possible implementation of the first aspect or the third aspect. The function may be implemented by hardware, or may be implemented by hardware executing corresponding software. The hardware or the software includes one or more units corresponding to the foregoing function.

In a possible design, when the apparatus is the first station, the first station includes a transceiver module and a processing module. The processing module may be, for example, a processor, the transceiver module may be, for example, a transceiver, and the transceiver includes a radio frequency circuit.

Optionally, the first station further includes a storage unit, and the storage unit may be, for example, a memory. When the first station includes the storage unit, the storage unit is configured to store a computer-executable instruction, the processing module is connected to the storage unit, and the processing module executes the computer-executable instruction stored in the storage unit, so that the first station performs the data communications method in the first aspect or the third aspect or any possible implementation of the first aspect or the third aspect.

In another possible design, when the apparatus is the chip in the first station, the chip includes a transceiver module and a processing module. The processing module may be, for example, a processor, and the transceiver module may be, for example, an input/output interface, a pin, or a circuit on the chip. The processing module may execute a computer-executable instruction stored in a storage unit, so that the chip in the first station performs the data communications method in the first aspect or the third aspect or any possible implementation of the first aspect or the third aspect.

Optionally, the storage unit is a storage unit in the chip, for example, a register or a cache. The storage unit may alternatively be a storage unit that is in the first station and that is located outside the chip, for example, a read-only memory (ROM) or another type of static storage device that can store static information and an instruction, or a random access memory (RAM).

Any one of the processors mentioned above may be a general-purpose central processing unit (CPU), a microprocessor, an application-specific integrated circuit (ASIC), or one or more integrated circuits configured to control execution of a program of the data communications method in any one of the first aspect or the third aspect.

According to a sixth aspect, this application provides a data communications apparatus. The apparatus may be an access point, or may be a chip in an access point. The apparatus has a function of implementing each embodiment in the second aspect or the fourth aspect or any possible implementation of the second aspect or the fourth aspect. The function may be implemented by hardware, or may be implemented by hardware executing corresponding software. The hardware or the software includes one or more units corresponding to the foregoing function.

In a possible design, when the apparatus is the access point, the access point includes a transceiver module and a processing module. The processing module may be, for example, a processor, the transceiver module may be, for example, a transceiver, and the transceiver includes a radio frequency circuit. Optionally, the access point further includes a storage unit, and the storage unit may be, for example, a memory. When the access point includes the storage unit, the storage unit is configured to store a computer-executable instruction, the processing module is connected to the storage unit, and the processing module executes the computer-executable instruction stored in the storage unit, so that the access point performs the data communications method in any one of the second aspect or the fourth aspect or any possible implementation of the second aspect or the fourth aspect.

In another possible design, when the apparatus is the chip in the access point, the chip includes a processing module and a transceiver module. The processing module may be, for example, a processor, and the transceiver module may be, for example, an input/output interface, a pin, or a circuit on the chip. The processing module may execute a computer-executable instruction stored in a storage unit, so that the chip in the access point performs the data communications method in the second aspect or the fourth aspect or any possible implementation of the second aspect or the fourth aspect. Optionally, the storage unit is a storage unit in the chip, for example, a register or a cache. The storage unit may alternatively be a storage unit that is in the access point and that is located outside the chip, for example, a ROM or another type of static storage device that can store static information and an instruction, or a RAM.

Any one of the processors mentioned above may be a CPU, a microprocessor, an ASIC, or one or more integrated circuits configured to control execution of a program of the data communications method in any one of the second aspect or the fourth aspect or any possible implementation of the second aspect or the fourth aspect.

According to a seventh aspect, a communications system is provided. The communications system includes the apparatus according to the fifth aspect and the apparatus according to the sixth aspect.

According to an eighth aspect, a computer storage medium is provided. The computer storage medium stores program code. The program code is used to indicate an instruction of performing the method according to any one of the first aspect, the second aspect, the third aspect, the fourth aspect, or any possible implementation thereof.

According to a ninth aspect, a processor is provided. The processor is configured to be coupled to a memory, and configured to perform the method according to any one of the first aspect, the second aspect, the third aspect, the fourth aspect, or any possible implementation thereof.

According to a tenth aspect, a computer program product including an instruction is provided. When the computer program product runs on a computer, the computer is enabled to perform the method in any one of the first aspect, the second aspect, the third aspect, the fourth aspect, or any possible implementation thereof.

Based on the foregoing solutions, the first STA receives the time adjustment information, where the time adjustment information is used to indicate the sending moment at which the signal is sent by using each of at least two beams. The first STA may send the data at the corresponding sending moment based on the time adjustment information by using the corresponding beam. In this way, the AP can simultaneously receive the data sent by the at least one station by using the at least two beams. This ensures the data validity and improves the data communication efficiency.

BRIEF DESCRIPTION OF DRAWINGS

FIG. 4 is a schematic structural diagram of a time adjustment information field according to an embodiment of this application;

FIG. 5 is a schematic diagram of a time adjustment information field according to another embodiment of this application;

FIG. 7 is a schematic structural diagram of a feedback frame according to an embodiment of this application;

DESCRIPTION OF EMBODIMENTS

Figure 1:
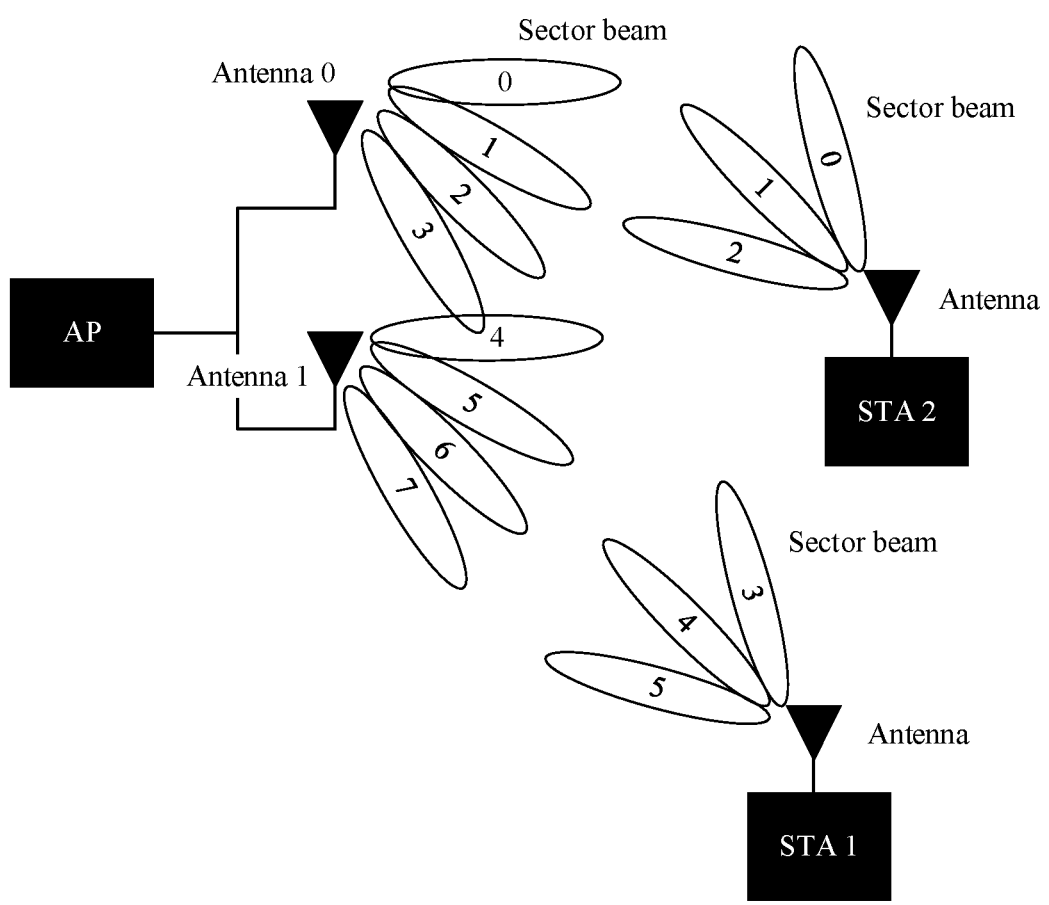
FIG. 1 is a schematic diagram of a communications system according to this application.

The following describes the technical solutions in this application with reference to the accompanying drawings.

The technical solutions of embodiments of this application may be applied to various communications systems, such as a wireless local area network (WLAN) system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, and a 5th generation (5G) system or a new radio (NR) system.

A station (STA) in the embodiments of this application is a communications apparatus that has a wireless transceiver function, and may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The STA may alternatively be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, a terminal device in a future evolved public land mobile network (PLMN), a STA in a WLAN system, or the like. In this embodiment of this application, the STA is used as an example for description. However, this is not limited in this application.

An access point (AP) in the embodiments of this application is a communications apparatus that has a wireless transceiver function, may provide a service for a station, and may be a device configured to communicate with the STA. The AP may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario, or may be an AP in a WLAN system, or may be a relay station, a vehicle-mounted device, a wearable device, a network device in a future 5G network, a network device in a future evolved PLMN network, or the like. In this embodiment of this application, the AP is used as an example for description. However, this is not limited in this embodiment of this application.

The following describes terms used in this application.

Beamforming: Beamforming is a method for implementing a necessary transmission link budget for a subsequent communication process by two or more communications parties; to be specific, enhancing a signal by concentrating a sent or received signal in a beam direction of a receiver or a transmitter, so as to select a beam with relatively strong signal quality or/and relatively weak interference for communication. In this way, communications signal quality between two communication ends is improved. Beamforming training is a bidirectional beamforming frame transmission sequence procedure. Beam scanning and providing necessary signaling are used to enable an AP or a STA to determine an appropriate antenna system setting for transmission and reception.

Antenna: An antenna is usually a single basic antenna including a phase array, or is an assembly including a series of switchable beam antennas. The antenna may form a pseudo-omnidirectional directivity pattern. Regardless of which implementation, the antenna may be dynamically configured as the pseudo-omnidirectional directivity pattern for transmission or reception, or dynamically configured for transmission or reception for a specific sector or beam.

Radio frequency (radio frequency, RF) chain: A radio frequency chain is a physical entity that may be used for a receiver chain or a transmitter chain. Usually, an analog-to-digital converter (ADC) or a digital-to-analog converter (DAC) is connected to an antenna. The RF chain may be configured to perform processing such as up-down conversion, filtering, and power amplification (for example, low noise amplification), so as to adjust a signal to a signal that is suitable for sending by using a radio frequency antenna, or convert a signal collected by the antenna to a signal that is suitable for sampling and baseband processing. In addition, when N RF chains are connected to N antennas in a one-to-one correspondence, for example, when one RF chain is fixedly connected to only one specific antenna, an RF chain identifier or an antenna identifier may be used to distinguish between the N RF chains and the N antennas.

It should be noted that, because costs of an RF chain are relatively high, and a plurality of antennas can be used to achieve a diversity effect, one RF chain may be dynamically configured to connect to at least one specific antenna of the plurality of antennas.

FIG. 1 is a schematic diagram of a communications system according to this application. The communications system in FIG. 1 may include one AP and a plurality of STAs. The plurality of STAs have a capability of simulating beamforming. When the plurality of STAs receive or send signals in parallel, such a scenario is referred to as "multiple-input multiple-output (MU-MIMO)". For example, when the AP receives signals from the plurality of STAs in parallel in space domain, such a scenario is referred to as uplink MU-MIMO. When the AP sends signals to the plurality of STAs in parallel in space domain, such a scenario is referred to as downlink MU-MIMO. In addition, antennas of the plurality of APs may be jointly used to send signals to or receive signals from the STA, such a scenario may also constitute MIMO.

Figure 2:
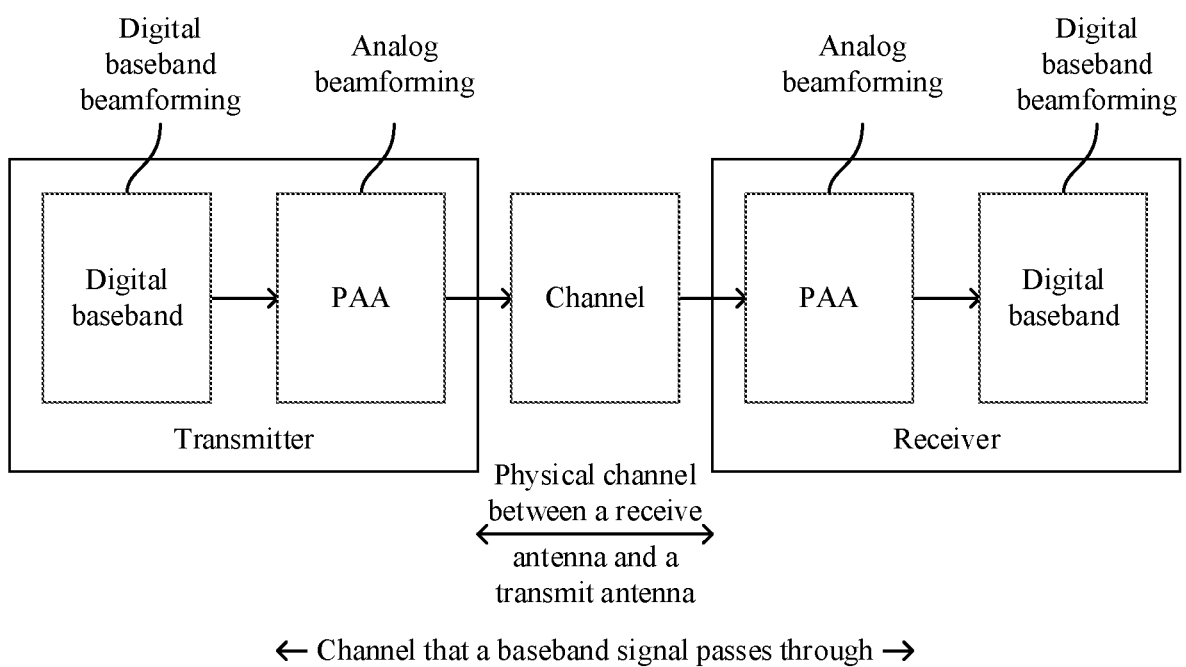
FIG. 2 is a schematic diagram of another communications system according to this application.

FIG. 2 is a schematic diagram of another communications system according to this application. A station needs to control analog beamforming and digital baseband beamforming based on a channel condition, so as to enhance a signal and reduce interference. Specifically, for the digital baseband beamforming, a channel between a digital baseband at a transmit end and a digital baseband at a receive end depends on a beam direction for the analog beamforming and a physical channel that is determined based on a surrounding physical environment. In the communications system in FIG. 2, a plurality of signals may be output by using the digital baseband at the transmit end, and each signal is output to an antenna, for example, a phased antenna array (PAA) that has a beamforming capability.

In the embodiments of this application, the AP controls, by using time adjustment information, sending time points at which the STA sends uplink data by using a plurality of beams, so that a time difference between arrivals, at the AP, of signals sent by the STA by using the plurality of beams can be controlled within a tolerable range of the AP. This improves quality and efficiency of data communication. In addition, in a high-frequency 60 GHz system, a problem that a tolerance range for time misalignment of data communication performed by using different beams is small can be effectively overcome, so as to avoid a problem that signal reception at the receive end is affected when a time difference between arrivals, at the receive end, of signals transmitted by using a plurality of beams is greater than a GI (that is, the time difference exceeds the tolerance range).

It may be understood that the technical solutions in the embodiments of this application may be applied between APs, or may be applied between an AP and a STA, or may be applied between STAs. For ease of description, communication between the AP and the STA is used as an example for description in the embodiments of this application.

Figure 3:
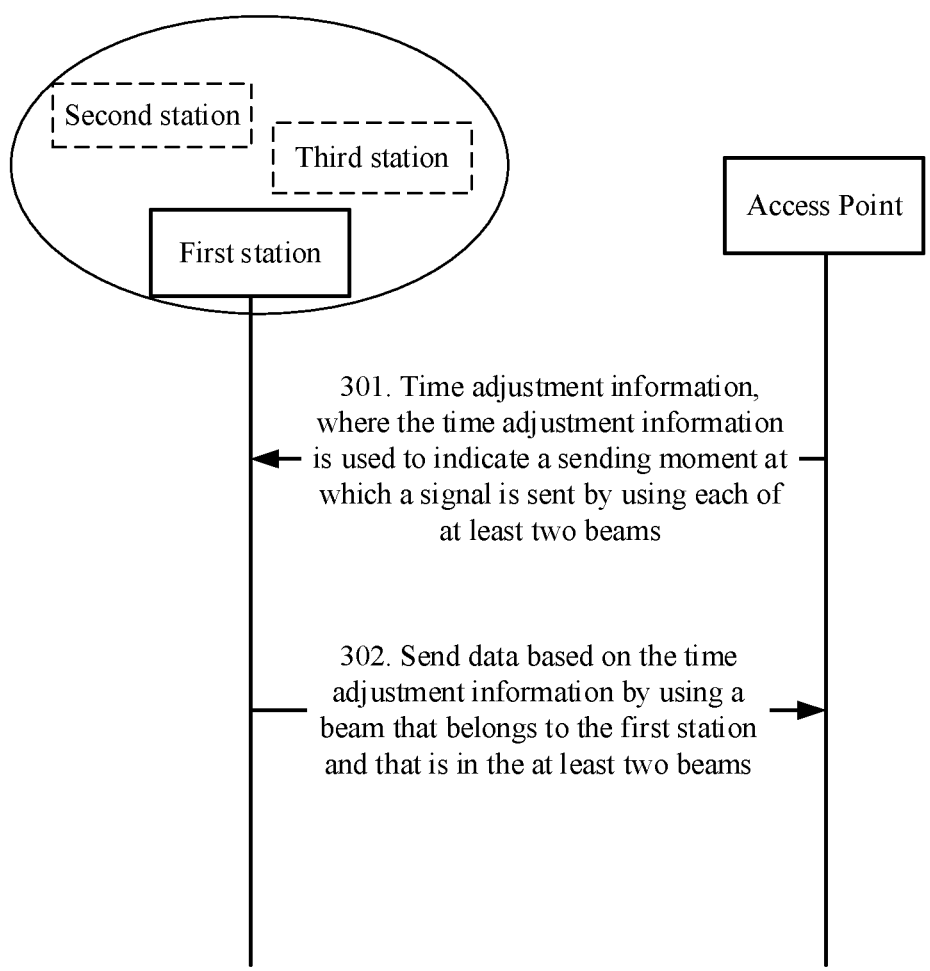
FIG. 3 is a schematic flowchart of a data communications method according to an embodiment of this application.

FIG. 3 is a schematic flowchart of a data communications method according to an embodiment of this application.

301. A first STA receives time adjustment information, where the time adjustment information is used to indicate a sending moment at which a signal is sent by using each of at least two beams. Correspondingly, an AP sends the time adjustment information.

Specifically, the at least two beams may be beams that belong to one station, or may be beams that belong to different stations. This is not limited in this application. The first STA may be any station of at least one station. The AP sends the time adjustment information to each station (for example, a second STA and a third STA) of the at least one station. Each station of the at least one station may perform a corresponding action as the first station. For ease of description, in the following embodiment, the first station is used as an example for description. In other words, a sending moment at which a signal is sent by using one beam may be indicated to one STA, or sending moments at which signals are sent by using a plurality of beams may be indicated to one STA.

It should be noted that the time adjustment information may explicitly indicate a sending moment at which a signal is sent by using each of the at least two beams. Alternatively, the time adjustment information may implicitly indicate a sending moment at which a signal is sent by using each of the at least two beams. For example, the time adjustment information may include an association relationship or a rule between sending moments at which signals are sent by using all beams. This is not limited in this application.

It should be further noted that one beam or a plurality of consecutive beams may form one sector. In this embodiment of this application, descriptions are provided on a per-beam basis. The beam may also be replaced with a "sector". In other words, a signal is received or transmitted on a per-sector basis. This is not limited in this application. It should be understood that the signal in this embodiment of this application may be a reference signal, a control signal, or data. This is not limited in this application. It should be further understood that, in this embodiment of this application, a beam used to send the signal may be considered as a "spatial stream", and the "beam" or the "spatial stream" is not distinguished in the following embodiment.

302. The first STA sends data based on the time adjustment information by using a beam that belongs to the first station and that is in the at least two beams. Correspondingly, the AP receives data sent by using the at least two beams.

Specifically, the first STA may determine, based on the time adjustment information, a sending moment at which a signal is sent by using the beam that belongs to the first STA and that is in the at least two beams, and may send the data at the corresponding sending moment based on the time adjustment information by using the corresponding beam. In this way, the AP can simultaneously receive the data sent by the at least one station by using the at least two beams. This ensures data validity and improves data communication efficiency.

It should be noted that the time adjustment information may include an identifier of each beam, and a sending moment corresponding to each of the plurality of beams is distinguished by using a beam identifier. For example, consistent numbers may be used as beam identifiers of the at least two beams. When the at least two beams belong to at least two stations, a beam corresponding to each station may be separately numbered. In this way, the time adjustment information may include an identifier (for example, which is referred to as a STA indication) of a station to which the beam belongs and an identifier of the beam, to distinguish between different beams. Optionally, the STA indication may be indicated by using at least one bit. For example, a bitmap is used to indicate a media access control (MAC) address of a STA, or indicate an association identifier (association ID, AID) of an AP associated with a station, or indicate a user in a user group allocated to an AP.

Alternatively, sending moments that are indicated by the time adjustment information and at which signals are sent by using the at least two beams may be sorted according to a preset rule. In this way, the time adjustment information may not include a beam identifier, and a sending moment corresponding to each beam can be identified according to the preset rule.

It should be further noted that sending data at the sending moment corresponding to each beam may alternatively be sending a target signal at a same moment by using each of the at least two beams. If a sending moment that corresponds to a beam and at which the data is to be sent is not reached, another signal may be first sent. To be specific, the at least two beams may start to be used to send the target signals at the indicated sending moment, a time offset is padded by using the another signal, and the target signal is sent when the sending moment of the target signal corresponding to the beam is reached, so as to ensure that target signals sent by using different beams simultaneously arrive at the AP. This ensures data validity.

It should be understood that, in this embodiment of this application, that the AP "simultaneously receives" data may be that the AP "can receive data within a preset time difference threshold range". The preset time difference threshold range may be an upper limit of a time difference that can be tolerated by the AP, for example, may be a guard interval GI, or another value less than a GI. The preset time difference threshold range may be pre-agreed on by the AP and each station, or may be flexibly set by the AP and notified to each station. This is not limited in this application.

It should be further understood that the at least one STA may send data based on the time adjustment information by using a beam that belongs to the at least one STA, or may send another signal such as a reference signal. This is not limited in this application.

Optionally, the time adjustment information may include a time offset of each beam, other than a first beam, in the at least two beams relative to a sending moment of the first beam.

Specifically, the sending moment at which a signal is sent by using the first beam may be preset. Alternatively, a sending moment at which a signal is sent by using any one of the at least two beams is preset, and the sending moment at which a signal is sent by using the first beam may be determined based on the sending moment at which a signal is sent by using the any beam. In this way, the at least one station sends the data at a proper time by using the corresponding beam, and data sent by using different beams can simultaneously arrive at the access point. This ensures effectiveness of data communication and improves the data communication efficiency.

It should be noted that the first beam may be the beam corresponding to the first station, or may be a beam corresponding to another station. This is not limited in this application. For ease of description, the following uses an example in which the first beam is the beam corresponding to the first station for description.

It should be further noted that the first beam may be any one of the at least two beams. More specifically, the first beam may be a beam whose transmission time period for sending a signal from a station to which the first beam belongs to the access point is the shortest, or may be a beam whose transmission time period for sending a signal is the longest, or may be a beam whose transmission time period for sending a signal is a median value. Correspondingly, if the first beam is the beam whose transmission time period for sending the signal is the shortest, time offsets in the time adjustment information are all positive integers. If the first beam is the beam whose transmission time period for sending the signal is the longest, time offsets in the time adjustment information are all negative integers. If the first beam is the beam whose transmission time period for sending the signal is the median value, time offsets in the time adjustment information include positive integers or negative integers.

It should be understood that a granularity of time offsets of sending moments at which signals are sent by using different beams relative to a sending moment at which a signal is sent by using another beam may be the same, or may be different. This is not limited in this application.

Optionally, the time adjustment information may further include a first time offset of a sending moment at which a signal is sent by using the first beam in the at least two beams relative to a preset moment.

Specifically, the sending moment at which the signal is sent by using the first beam may also be configured by using the time adjustment information, and the time adjustment information includes the time offset of the sending moment at which the first station sends the signal by using the first beam. In this way, the first station can learn of, based on the preset moment and the time offset of the sending moment at which the signal is sent by using the first beam relative to the preset moment, the sending moment at which the signal is sent by using the first beam.

It should be noted that the preset moment in this application may be a fixed moment after an uplink triggering time interval agreed in the protocol, or a sending moment used to perform data communication last time, or a time offset of a sending moment used to perform data communication last time relative to a fixed moment. This is not limited in this application.

It should be understood that, in this embodiment of this application, a quantity of time offsets carried in the time adjustment information may be in a one-to-one correspondence with a quantity of beams.

Optionally, the time adjustment information may be carried in a multi-beam feedback frame by using a time adjustment information field, and is sent by the AP to the STA.

Specifically, the time adjustment information field may include the sending moment at which the signal is sent by using each beam, or the multi-beam feedback frame includes the time offset of the first beam relative to the preset moment and time offsets of sending moment of the at least two other beams relative to the sending moment of the first beam.

For example, as shown in FIG. 4, a beam 0 represents the first beam, and other beams are respectively numbered as a beam 1, a beam 2, . . . , and a beam i. The time adjustment information field may include the sending moment at which the signal is sent by using each beam, for example, a sending moment at which a signal is sent by using a beam 0 (time advance for beam 0). That is, beams corresponding to the STA 1 and the STA 2 shown in FIG. 1 are consistently numbered as a beam 0, a beam 1, . . . , and a beam 5, where the first beam may be any one of the six beams.

For example, as shown in FIG. 5, a beam 0 represents the first beam, and other beams are respectively numbered as a beam 1, a beam 2, . . . , and a beam i. The time adjustment information field may include a time offset of a sending moment of the beam 0 (time advance offset for beam 0) relative to the preset moment, and time offsets of the foregoing other beams (time advance offset for beam i) relative to the first beam.

It should be noted that the time adjustment information field may further include a beam identifier (for example, a beam index (beam index)) of each beam, to distinguish sending moments or time offsets corresponding to all beams. In addition, the time adjustment information field may further include a total quantity of the at least two beams.

It should be further noted that, in FIG. 4 or FIG. 5, beam indexes are sorted in a consecutive order. Before all sorted beam indexes, there are sending moments corresponding to all consecutive beam indexes, or after all sorted beam indexes, there are time offsets corresponding to all consecutive beam indexes. In this embodiment of this application, in FIG. 4, each beam index may be adjacent to a sending moment corresponding to the beam index, and in FIG. 5, each beam index may be adjacent to a time offset corresponding to the beam index.

It should be understood that the multi-beam feedback frame may also be a multi-beam configuration frame (MIMO configuration frame) I, or may be a "time ranging (ranging) frame", or another frame that carries information for performing time alignment indication, or another frame that carries information for measuring a time propagation delay.

Optionally, the time adjustment information includes a time offset of a sending moment at which the second station in the at least one station sends a signal relative to a preset moment, and a time offset of the sending moment at which the second station sends the signal relative to the sending moment of each of the at least two beams.

Specifically, the sending moment at which the second station sends the signal is an equivalent moment of a sending moment at which a signal is sent by using a beam corresponding to the second station (for example, which may be an average value of sending moments at which signals are sent by using at least two beams corresponding to the second station). The time adjustment information carries the time offset of the sending moment at which the second station sends the signal relative to the preset moment. In this way, the first station can learn of the sending moment at which the second station sends the signal. The time adjustment information further carries the time offset of each of the at least two beams relative to the sending moment at which the second station sends the signal. In this way, the first station may learn of, based on the sending moment at which the second station sends the signal, the sending moment at which the signal is sent by using each beam. Therefore, the first station can send the data by using the corresponding beam at a proper moment, to ensure alignment of data that arrives at the access point and that is sent by using different beams, in other words, ensure effectiveness of data communication, and improve the data communication efficiency.

It should be understood that the second station may be any one of the at least one station, and the second station and the first station may be a same station, or may be different stations. This is not limited in this application.

Optionally, the time adjustment information includes a time offset of the sending moment at which the signal is sent by using each of the at least two beams relative to the preset moment. In this way, the first station may determine, based on the time adjustment information, the sending moment at which the signal is sent by using each of the at least two beams, to ensure alignment of time points at which the data sent by using different beams arrives at the access point, and improve the data communication efficiency.

Optionally, the time offset may be represented by using a time offset field in the time adjustment information.

Specifically, the time offset field may be evenly mapped to the time offset, or may be unevenly mapped to the time offset. Unevenly mapping may be understood as that time offsets indicated by different values of the time offset field may be the same or may be different. Values of the time offset field are in ascending order, and corresponding time offsets may become smaller. In other words, when mapping with uneven intervals is performed, a corresponding time offset becomes smaller when an absolute value of the value of the time offset field is larger. For example, the time offset field is 2 bits, and the values of the time offset field may be 0, 1, 2, and 3, where 0 corresponds to 10 ms, 1 corresponds to 1 ms, 2 corresponds to 100 µs, and 3 corresponds to 1 µs. In this way, a larger value of the time offset field indicates a smaller time offset indicated by the time offset field. To be specific, a relatively small value of the time offset field is used to adjust the time offset to a great extent, and a relatively large value of the time offset field is used to adjust the time offset to a small extent.

Optionally, the time adjustment information may further include a line of sight (line of sight, LoS) identifier.

Specifically, when the protocol supports a maximum of $2^k$ spatial streams, the LoS identifier may be indicated by using a LoS indication field, and the LoS indication field may be k bits. That is, the k bits may be mapped to 1 to $2^k$ spatial stream numbers. In this way, the time adjustment information may be used to determine a corresponding LoS path by using the spatial stream number indicated by the LoS indication field.

Optionally, the time adjustment information may further include a field indicating a propagation delay of the LoS path. In other words, the time adjustment information may indicate the propagation delay of the LoS path by using an additional field.

Optionally, there may be a correspondence between the time offset indicated by the time adjustment information and a transmission delay of a transmission path. The time adjustment information may indicate the propagation delay of the LoS path by using the time offset, so as to avoid occupying an additional field and reduce signaling overheads.

Optionally, before receiving the time adjustment information, the first STA may further receive first configuration information and second configuration information, where the first configuration information is used to indicate the at least two beams, and the second configuration information is used to trigger a station to send a reference signal used for time measurement. The first STA sends, based on the second configuration information, the reference signal by using the at least two beams. Correspondingly, the AP sends the first configuration information and the second configuration information, receives the reference signal, and obtains the time adjustment information by measuring the reference signal.

Specifically, the first configuration information may directly indicate the at least two beams, or may indicate the at least two beams on a per-sector basis, and each sector includes at least one beam. To be specific, the first STA receives the first configuration information, and sends the reference signal on a beam configured by the AP to perform time offset measurement (the process may be referred to as time measurement training). In this way, the STA configures the beam specified by the AP, and performs the time offset measurement and data transmission on the beam specified by the AP. This can reduce interference between uplink spatial streams, improve transmission efficiency, and ensure communication quality. In addition, the second configuration information is used to trigger the station to send the reference signal used for time measurement. To be specific, after receiving the second configuration information, the first STA immediately starts an operation of sending the reference signal. For example, starting the operation of sending the reference signal may be preparing to send the reference signal after a time interval.

It should be noted that, that the station sends reference signals by using different beams, so that the AP performs the time offset measurement based on the reference signals may be specifically as follows: The station sends the reference signals at a same moment, and the AP determines, based on receiving moments at which the reference signals are received, time offsets for sending the reference signals by using the different beams. The reference signal sent by the station may be used to indicate beam identification information of a corresponding beam, so that the AP can identify the different beams.

Alternatively, the station sends reference signals by using different beams, and each reference signal carries a sending moment. In this way, the AP can determine, based on the sending moment carried in each reference signal, time offsets of sending moments at which the station sends the signals by using the different beams.

It should be further noted that the first configuration information and the second configuration information may be separately sent. For example, after the station receives the first configuration information and performs configuration, the AP then sends the second configuration information to trigger the station to send the reference signal. In this way, time measurement training of the reference signal may be performed based on a time point or a time period configured by the station, so that a time period for the time measurement training is reduced.

Optionally, the first configuration information may further include a UL power indication or a transmission bandwidth/sampling rate/time granularity indication. The UL power indication may indicate at least one of a signal power that the AP expects to receive per spatial stream, an uplink signal power that the AP expects to receive per user, a respective signal power that the AP expects to receive per spatial stream, and a respective signal power that the AP expects to receive per uplink user. The transmission bandwidth/sampling rate/time granularity indication may indicate a bandwidth format of an uplink PPDU, for example, 2.16 GHz, 4.32 GHz, 8.64 GHz, or another bandwidth mode specified in the protocol. If the PPDU is divided into a plurality of resource blocks in frequency domain and allocated to a plurality of STAs for transmission, the first configuration information may further include a size of a resource block and a frequency domain position that are used by each STA. A larger bandwidth indicates a larger sampling rate and a smaller time granularity.

Optionally, the first configuration information may further include an antenna sector configuration indication used by the STA, and the antenna sector configuration indication may include a transmit antenna identity (ID), a transmit beam ID (or a transmit sector ID), a counting down (CDOWN) sequence number value, and an antenna weight vector (AWV) ID. Optionally, the first configuration information may further include one or more of a receive antenna ID, a receive beam ID (receive sector ID), or the AWV ID used by the AP for receiving.

It should be understood that the CDOWN is used to indicate a frame counting down sequence number value of a string of frames sent in a respective beam direction. The AWV is used to indicate an antenna weighting vector. When a plurality of array elements on an antenna use different antenna weighting vectors, beam patterns sent or received by using the antenna are different (gain coefficients in specified directions are different).

Figure 6:
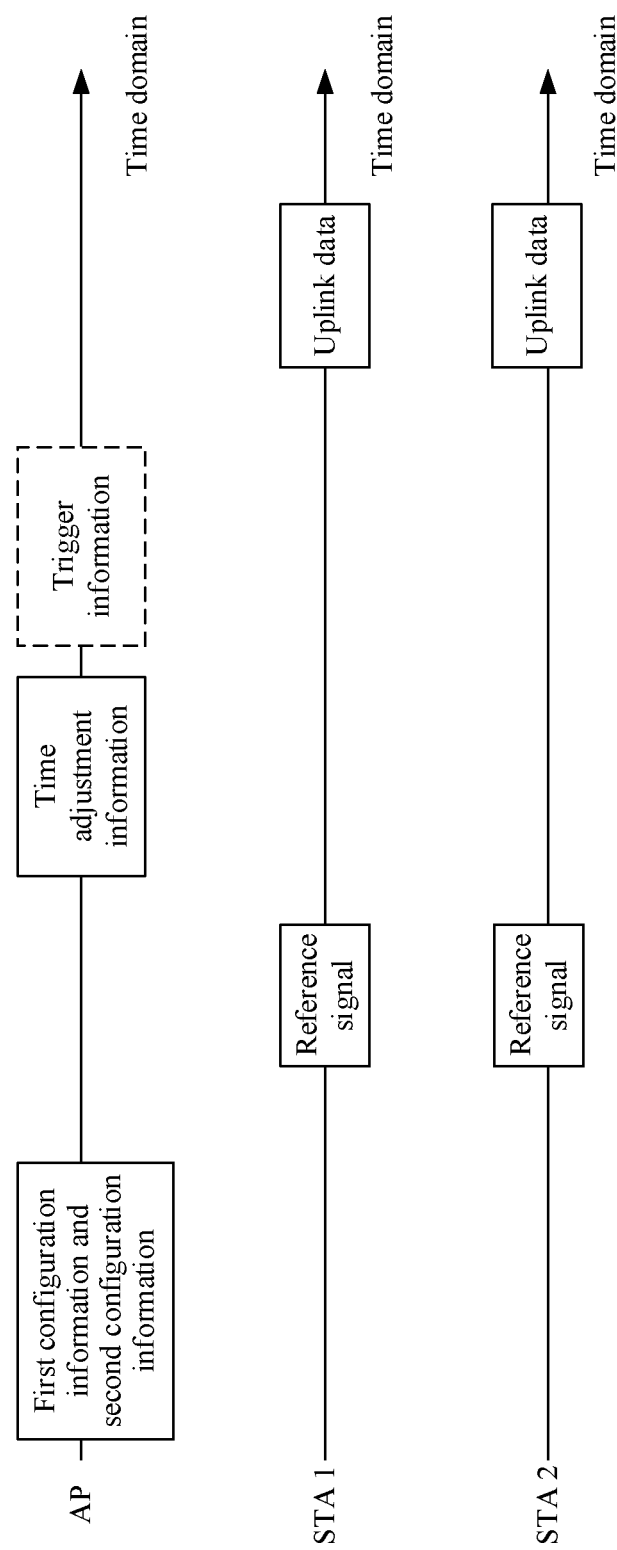
FIG. 6 is a schematic flowchart of a data communications method according to another embodiment of this application.

Optionally, the first configuration information and the second configuration information may be carried in a same multi-antenna configuration frame for training (MIMO configuration frame for training), for example, as shown in FIG. 6.

Specifically, the first configuration information and the second configuration information are carried in one frame for sending. Compared with separate sending, this reduces signaling overheads.

Optionally, the first configuration information may further include a session token field.

Specifically, the session token field is used to indicate each receive antenna of the AP. Specifically, a value of the session token field may be used to indicate a session token, and then the receive antenna is indicated by using the session token. For example, the session token field may indicate a token (token) of a session in which a currently transmitted multi-antenna configuration frame is located. Alternatively, the session token field indicates a token of a session to which a frame that carries a reference signal and that corresponds to a beam ID included in the antenna sector configuration indication belongs.

It should be noted that the frame that carries the reference signal may be a multi-beam training frame (MIMO training frame).

Optionally, the first station may receive a beam refinement protocol (beam refinement protocol, BRP) feedback frame, the BRP feedback frame includes a newly added field, and the newly added field is used to indicate the time adjustment information.

Specifically, the newly added field may be on a per training unit basis, and each training unit may be different beams, different sectors, or different AWV directions. In addition, each training unit may include a plurality of training signals that are orthogonal in time domain, and each training signal may be sent in different directions. In this embodiment of this application, the BRP feedback frame in an existing protocol is slightly modified to indicate the time adjustment information, so that overheads are reduced, and compatibility is improved.

For example, as shown in FIG. 7, the BRP feedback frame includes a BRP MIMO feedback identifier (BRP MIMO feedback), a feedback type (feedback type), and a time adjustment information field. The time adjustment information field may be shown in FIG. 4 or FIG. 5. The feedback type may be used to indicate whether the BRP feedback frame includes the time adjustment information field.

Figure 8:
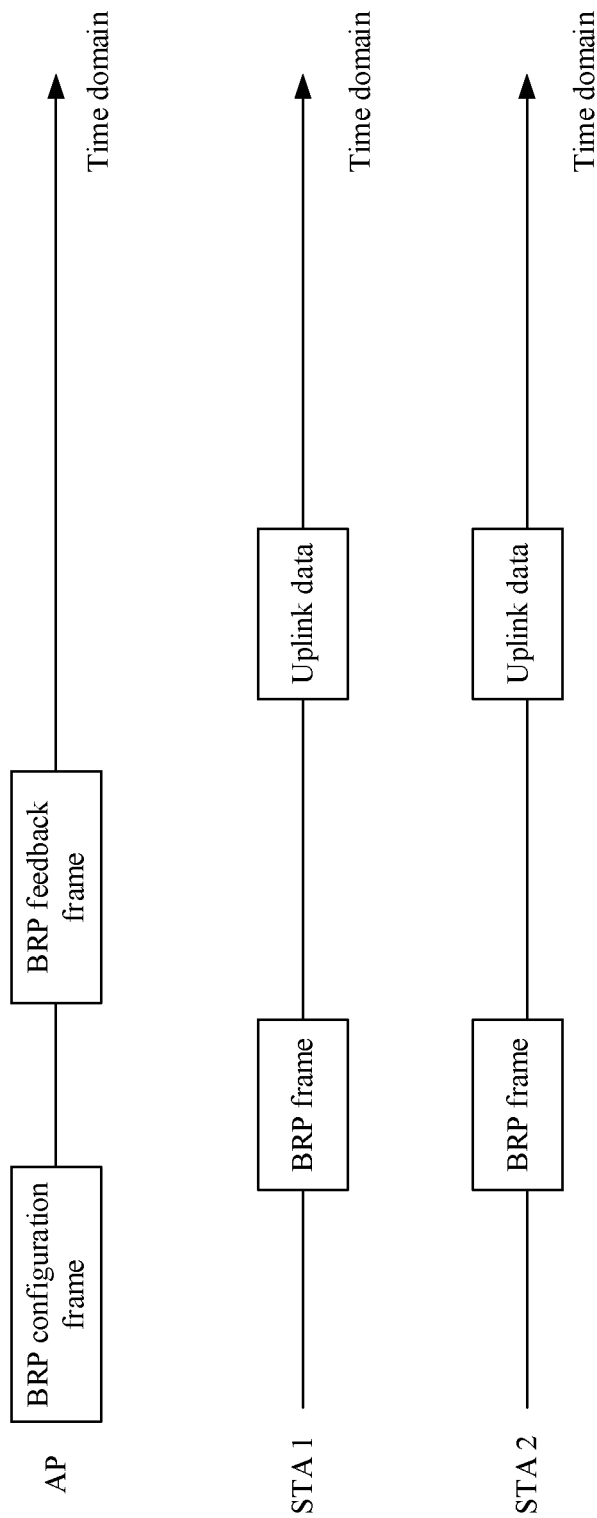
FIG. 8 is a schematic diagram of a data communications method according to still another embodiment of this application.

Optionally, when the time adjustment information is carried by using the BRP feedback frame, the first configuration information may be carried by using a newly added field in a BRP configuration frame. Correspondingly, the reference signal may also be carried in a BRP frame, for example, as shown in FIG. 8.

Optionally, the first configuration information and the second configuration information received by the first station may be separately sent. That is, antenna mode setting and the time measurement are separately configured. To be specific, the first station may perform uplink beam training after completing the antenna mode setting. By using a time interval shorter than a trigger frame, a time interval for measuring the time offset may be reduced, so that a data communication delay is reduced.

Optionally, that the first configuration information and the second configuration information are separately sent may be as follows: The first configuration information is carried in a request to send (RTS) frame or in a confirm to send (CTS) frame.

Figure 9:
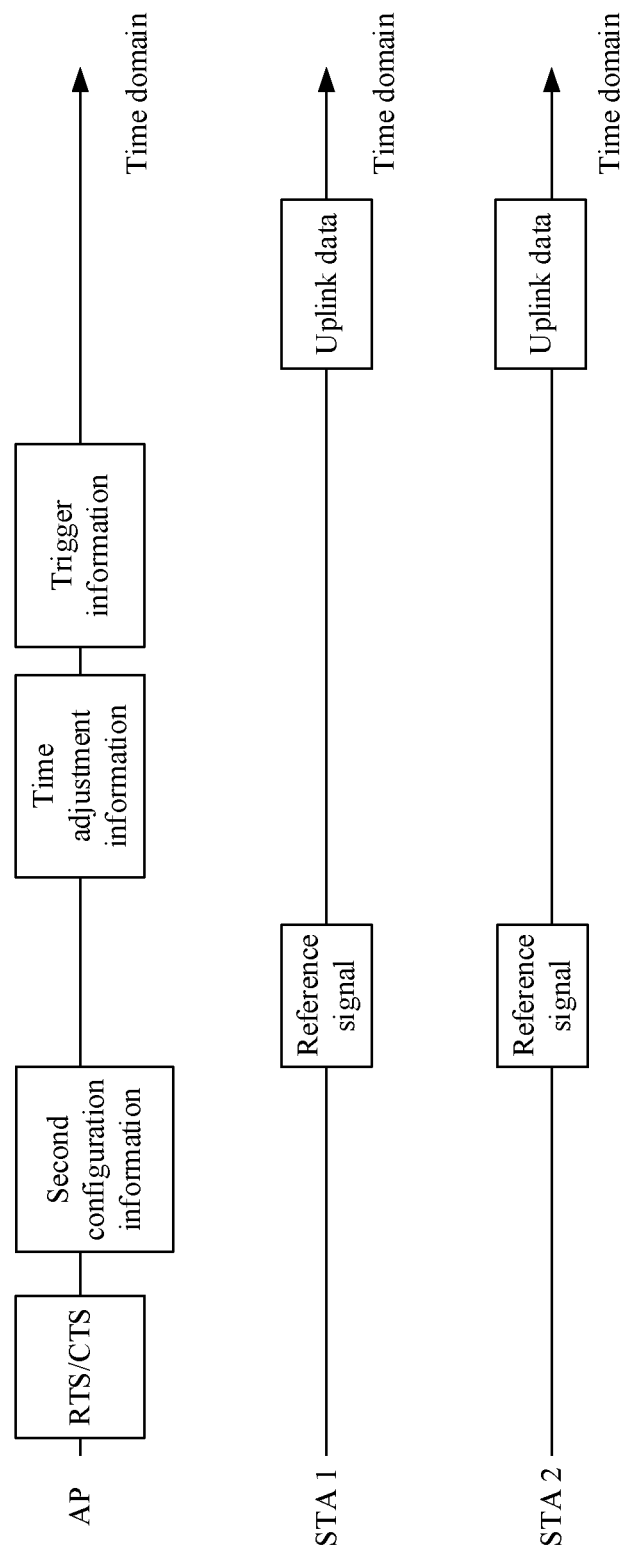
FIG. 9 is a schematic diagram of a data communications method according to still another embodiment of this application.

Specifically, as shown in FIG. 9, the first station receives the RTS frame and performs the antenna mode setting based on the first configuration information carried in the RTS frame, or the first station receives the CTS frame and performs antenna mode configuration based on the first configuration information carried in the CTS frame.

It should be noted that, in a case in which the AP sends the RTS frame, the STA may also feed back a CTS frame to indicate whether the RTS frame is successfully received.

Optionally, the first STA receives trigger information, where the trigger information is used to trigger the STA to send data. Correspondingly, the AP sends the trigger information. Specifically, after receiving the time adjustment information, the first STA learns of time offsets of sending moments at which signals are sent by using different beams, and the first STA may further send the data after receiving the trigger information, for example, as shown in FIG. 6.

It should be noted that in this embodiment of this application, within a preset moment threshold, considering that a change of the time offsets is not definite, after sending the time adjustment information, the AP may send only the trigger information when data communication needs to be performed. In other words, a quantity of pieces of the time adjustment information is different from a quantity of pieces of the trigger information.

Optionally, the time adjustment information and the trigger information are carried in a same multi-beam feedback frame.

Figure 10:
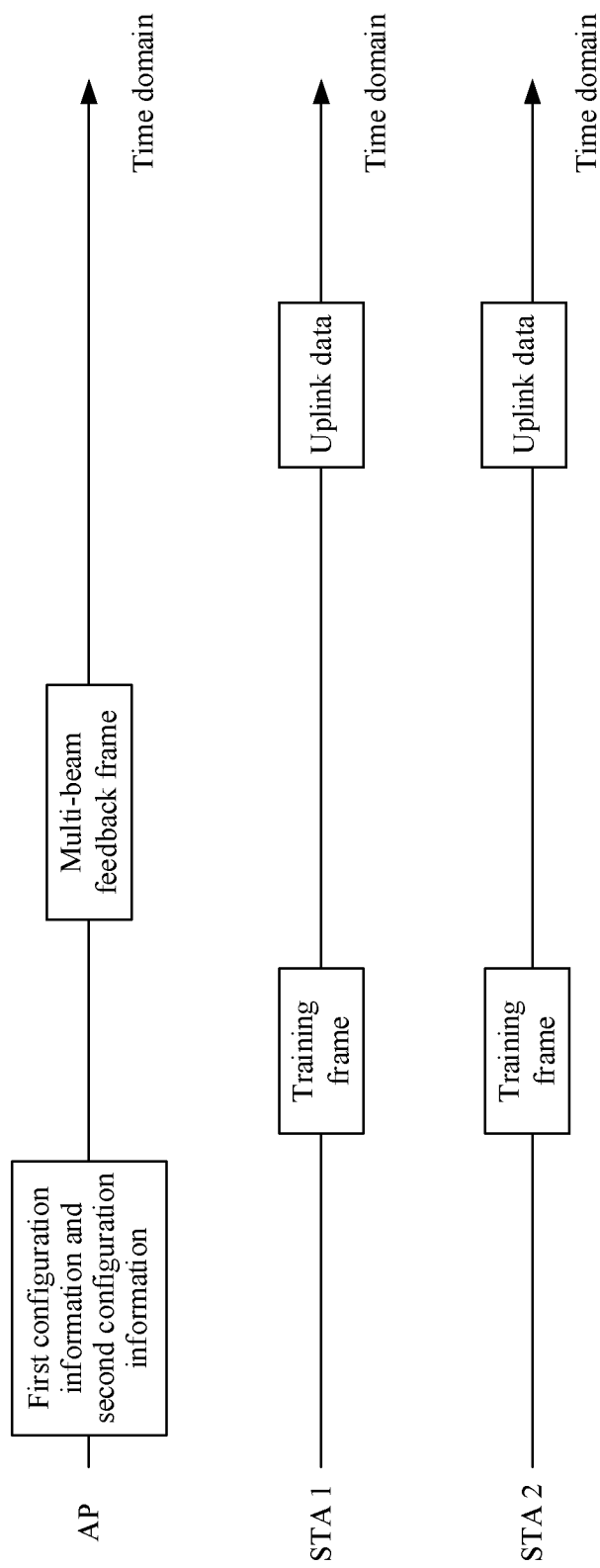
FIG. 10 is a schematic diagram of a data communications method according to still another embodiment of this application.

Specifically, the trigger information is used to trigger the first STA to send the data. The time adjustment information and the trigger information may be carried in the multi-beam feedback frame. The multi-beam feedback frame may also be referred to as a multi-beam configuration frame (MIMO Configuration frame) I, for example, as shown in FIG. 10. In this way, the AP may consecutively track and adjust time offsets of the at least two beams, so that the data communication efficiency is further improved.

Therefore, according to the data communications method in this embodiment of this application, the first STA receives the time adjustment information that is used to indicate the sending moment at which the signal is sent by using each of the at least two beams, and may send the data at the corresponding sending moment based on the time adjustment information by using the corresponding beam. In this way, the AP can simultaneously receive the data sent by the at least one station by using the at least two beams. This ensures data validity and improves the data communication efficiency.

It should be understood that specific examples in the embodiments of this application are merely used to help a person skilled in the art to better understand the embodiments of this application, but are not used to limit the scope of the embodiments of this application.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

The foregoing describes in detail the data communications method according to the embodiments of this application. The following describes data communications apparatuses according to the embodiments of this application.

Figure 11:
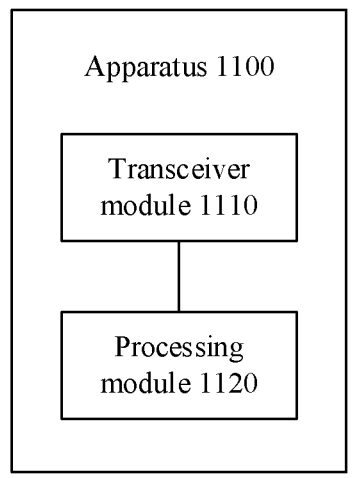
FIG. 11 is a schematic block diagram of a data communications apparatus according to an embodiment of this application.

FIG. 11 is a schematic block diagram of a data communications apparatus 1100 according to an embodiment of this application. The apparatus 1100 may include a transceiver module 1110 and a processing module 1120.

In an embodiment, the apparatus 1100 shown in FIG. 11 may correspond to the first station in the foregoing method embodiments, and may have any function of the first station in the method.

The transceiver module 1110 is configured to receive time adjustment information, where the time adjustment information is used to indicate a sending moment at which a signal is sent by using each of at least two beams, the at least two beams are beams corresponding to at least one station, and a first station is any one of the at least one station.

The processing module 1120 is configured to control, based on the time adjustment information, the transceiver module 1110 to send data by using a beam that belongs to the first station and that is in the at least two beams.

Specifically, a function of the transceiver module 1110 may correspond to step 301 in FIG. 3, and a function of the processing module 1120 may correspond to step 302 in FIG. 3.

It should be noted that each station may be equipped with one or more antennas, or equipped with an antenna that can be used in one or more APs. In addition, a station or an access point includes an antenna of an adjustable beam and a radio frequency chain corresponding to the antenna. The antenna and the radio frequency chain may be connected in a specified manner, or may be connected in a switchable (switchable) manner. The radio frequency chain may be further connected to the processing module. Optionally, the radio frequency chain may be further connected to a local clock source, so as to modulate a signal to a target frequency band or demodulate a signal. The local clock source may be used to indicate when to send a signal to provide a time reference. Optionally, the processing module may be further connected to a protocol module. The protocol module may be configured to encapsulate and decapsulate a packet, and execute a packet receiving and sending sequence agreed in the protocol, for example, send a training frame, receive a training frame, and reply with a feedback frame. Optionally, the protocol module may be further connected to an external interface module. The external interface module may be a PCI-3, USB3.0, USB2.0, HDMI, D-Port, NVMe, I2C, I2S, or another interface.

Optionally, the apparatus 1100 may further include the processing module 1120. The processing module 1120 may be configured to determine, based on the time adjustment information, the sending moment at which the signal is sent by using each beam.

Optionally, the time adjustment information includes: a time offset of a sending moment at which a signal is sent by using the first beam relative to a preset moment, and a time offset of each beam in beams, other than the first beam, in the at least two beams relative to the sending moment of the first beam.

Optionally, the time adjustment information includes a time offset of a sending moment at which a second station in the at least one station sends a signal relative to a preset moment, and a time offset of the sending moment at which the signal is sent by using each of the at least two beams relative to the sending moment at which the second station sends the signal.

Optionally, the transceiver module 1110 is further configured to:

receive first configuration information, where the first configuration information is used to indicate the at least two beams; and receive second configuration information, where the second configuration information is used to trigger the first station to send a reference signal.

The processing module 1120 is further configured to control, based on the second configuration information, the transceiver module 1110 to send the reference signal by using a beam that belongs to the first station and that is in the at least two beams, where the reference signal is used by an access point to determine sending moments at which signals are sent by using the at least two beams.

Therefore, the data communications apparatus in this embodiment of this application receives the time adjustment information that is used to indicate the sending moment at which the signal is sent by using each of the at least two beams, and may send the data at a corresponding sending moment based on the time adjustment information by using the corresponding beam. In this way, the AP can simultaneously receive data sent by the at least one station by using the at least two beams. This ensures data validity and improves data communication efficiency.

Optionally, the data communications apparatus 1100 in this embodiment of this application may be the first station, or may be a chip in the first station.

It should be understood that the data communications apparatus 1100 according to this embodiment of this application may correspond to the first station in the data communications method in the embodiments in FIG. 3 to FIG. 10. In addition, the foregoing and other management operations and/or functions of the modules in the data communications apparatus 1100 are respectively used to implement corresponding steps of the foregoing methods. For brevity, details are not described herein again.

Figure 12:
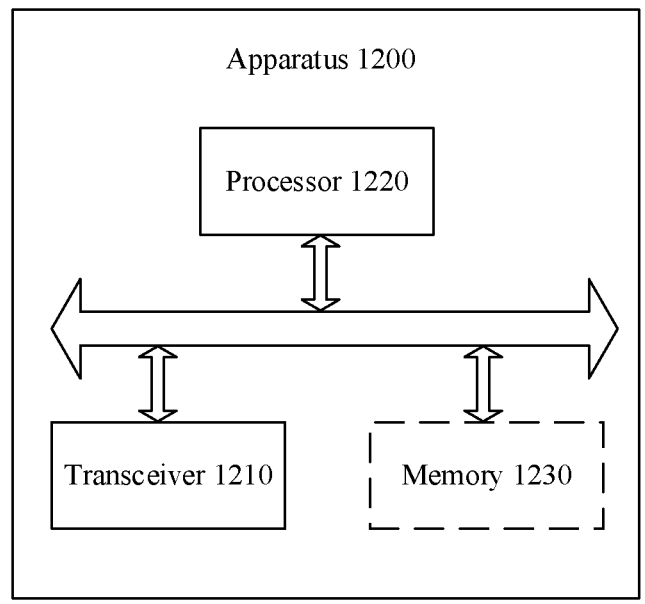
FIG. 12 is a schematic structural diagram of a data communications apparatus according to an embodiment of this application.

Optionally, if the data communications apparatus 1100 is the first station, the transceiver module 1110 in this embodiment of this application may include a receiving module and a sending module, or may be implemented by a transceiver 1210, and the processing module 1120 may be implemented by a processor 1220. FIG. 12 is a schematic structural diagram of a data communications apparatus 1200 according to an embodiment of this application. The data communications apparatus 1200 may include the transceiver 1210 and the processor 1220. The processor 1220 may be configured to support the first station in performing a corresponding function in the foregoing method. The transceiver 1210 may be configured to: support communication between the first station and the access point, and receive or send corresponding information or an instruction in the foregoing method. In an example, the processor 1220 may perform baseband processing and radio frequency processing on a signal, and the transceiver 1210 such as an antenna may receive and send a signal. In another example, the processor 1220 may generate a baseband signal, the transceiver 1210 may include a radio frequency circuit, configured to perform radio frequency processing on the baseband signal, the radio frequency circuit may be configured to modulate a low-frequency baseband signal to a high-frequency carrier signal, and the high-frequency carrier signal is transmitted by using an antenna. The radio frequency circuit is also configured to demodulate a high-frequency signal received by using the antenna into a low-frequency carrier signal. For example, the transceiver 1210 may receive the time adjustment information, and the processor 1220 may perform processing (for example, filtering, amplification, down-conversion, and digitization) on the time adjustment information to obtain the sending moment, and control the transceiver 1210 to send data at sending moments corresponding to different beams.

Optionally, the data communications apparatus 1200 may further include a memory 1230. The memory 1230 may be configured to store indication information, and may be further configured to store code, an instruction, and the like that are executed by the processor 1220. The transceiver 1210 may include a radio frequency circuit. Optionally, the first station further includes a storage unit.

The storage unit may be, for example, a memory. When the first station includes the storage unit, the storage unit is configured to store a computer-executable instruction, the processing module is connected to the storage unit, and the processing module executes the computer-executable instruction stored in the storage unit, so that the first station performs the foregoing data communications method.

Optionally, if the data communications apparatus 1100 is the chip in the first station, the chip includes the transceiver module 1110 and the processing module 1120. The transceiver module 1110 may be implemented by a transceiver 1210, and the processing module 1120 may be implemented by a processor 1220. The transceiver module may be, for example, an input/output interface, a pin, or a circuit. The processing module can execute a computer-executable instruction stored in a storage unit. The storage unit is a storage unit in the chip, for example, a register or a cache. The storage unit may alternatively be a storage unit that is in the access point and that is located outside the chip, for example, a read-only memory (ROM) or another type of static storage device that can store static information and an instruction, or a random access memory (RAM).

In another embodiment, the data communications apparatus 1100 shown in FIG. 11 may correspond to the access point in the foregoing method embodiments, and may have any function related to the access point in the foregoing method embodiments.

A processing module 1120 is configured to generate time adjustment information, where the time adjustment information is used to indicate a sending moment at which a signal is sent by using each of at least two beams, and the at least two beams are beams corresponding to at least one station.

A transceiver module 1110 is configured to send the time adjustment information to the at least one station.

The transceiver module 1110 is further configured to receive data that is sent by the at least one station based on the time adjustment information by using the at least two beams.

Specifically, the transceiver module 1110 may correspond to step 301 and/or step 302 in FIG. 3.

Optionally, the time adjustment information includes a first time offset of a sending moment at which a signal is sent by using a first beam in the at least two beams relative to a preset moment, and a time offset of a sending moment at which a signal is sent by using each beam in beams, other than the first beam, in the at least two beams relative to the sending moment at which the signal is sent by using the first beam.

Optionally, the time adjustment information includes a second time offset of a sending moment at which a second station in the at least one station sends a signal relative to a preset moment, and a time offset of the sending moment at which the signal is sent by using each of the at least two beams relative to the sending moment at which the second station sends the signal.

Optionally, the transceiver module 1110 is further configured to:

send first configuration information, where the first configuration information is used to indicate the at least two beams;

send second configuration information, where the second configuration information is used to trigger a station to send a reference signal; and receive the reference signal.

The processing module 1120 is further configured to determine, based on the reference signal, sending moments at which signals are sent by using the at least two beams.

Therefore, the data communications apparatus in this embodiment of this application sends the time adjustment information to the at least one station, so that each station determines, based on the time adjustment information, a sending moment at which a signal is sent by using a beam that belongs to the station and that is in the at least two beams. In this way, the access point may simultaneously receive data that is sent by each station at the corresponding sending moment based on the time adjustment information by using the corresponding beam, so that the AP can simultaneously receive data sent by the at least one station by using the at least two beams. This ensures data validity, and improves data communication efficiency.

Optionally, the data communications apparatus 1100 in this embodiment of this application may be the access point, or may be a chip in the access point.

It should be understood that the data communications apparatus 1100 according to this embodiment of this application may correspond to the access point in the data communications method in the embodiments in FIG. 3 to FIG. 10. In addition, the foregoing and other management operations and/or functions of the modules in the data communications apparatus 1100 are respectively used to implement corresponding steps of the foregoing methods. For brevity, details are not described herein again.

Optionally, if the data communications apparatus 1100 is the access point, the transceiver module 1110 in this embodiment of this application may include a receiving module and a sending module, or may be implemented by a transceiver 1210, and the processing module 1120 may be implemented by a processor 1220. FIG. 12 is a schematic structural diagram of a data communications apparatus according to an embodiment of this application. The data communications apparatus 1200 may include the transceiver 1210 and the processor 1220. The processor 1220 may be configured to support the access point in performing a corresponding function in the foregoing method. The transceiver 1210 may be configured to: support communication between the access point and the station, and receive or send corresponding information or an instruction in the foregoing method. In an example, the processor 1220 may perform baseband processing and radio frequency processing on a signal, and the transceiver 1210 such as an antenna may receive and send a signal. In another example, the processor 1220 may generate a baseband signal, the transceiver 1210 may include a radio frequency circuit, configured to perform radio frequency processing on the baseband signal, the radio frequency circuit may be configured to modulate a low-frequency baseband signal to a high-frequency carrier signal, and the high-frequency carrier signal is transmitted by using an antenna. The radio frequency circuit is also configured to demodulate a high-frequency signal received by using the antenna into a low-frequency carrier signal. For example, the processor 1220 may generate the time adjustment information, and then the transceiver 1210 processes (for example, analog conversion, filtering, amplification, and up-conversion) the time adjustment information and sends the time adjustment information to the access point.

Optionally, the data communications apparatus 1200 may further include a memory 1230. The memory 1230 may be configured to store indication information, and may be further configured to store code, an instruction, and the like that are executed by the processor 1220. The transceiver may include a radio frequency circuit. Optionally, the access point further includes a storage unit.

The storage unit may be, for example, a memory. When the access point includes the storage unit, the storage unit is configured to store a computer-executable instruction, the processing module is connected to the storage unit, and the processing module executes the computer-executable instruction stored in the storage unit, so that the access point performs the foregoing data communications method.

Optionally, if the data communications apparatus 1100 is the chip in the access point, the chip includes the processing module 1120 and the transceiver module 1110. The transceiver module 1110 may be, for example, an input/output interface, a pin, or a circuit on the chip. The processing module 1120 can execute a computer-executable instruction stored in a storage unit.

Optionally, the storage unit is a storage unit in the chip, for example, a register or a cache. The storage unit may alternatively be a storage unit that is in the access point and that is located outside the chip, for example, a read-only memory (read-only memory, ROM) or another type of static storage device that can store static information and an instruction, or a random access memory (RAM).

It should be understood that the processor 1220 in this embodiment of this application may be an integrated circuit chip having a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly performed and completed by using a hardware decoding processor, or may be performed and completed by using a combination of hardware and software modules in a decoding processor. The software module may be located in a mature storage medium in the field, for example, a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory 1230 in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. According to a description that is used as an example instead of a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchronous link DRAM, SLDRAM), and a direct rambus random access memory (direct rambus RAM, DR RAM). It should be noted that the memory of the systems and methods described in this specification includes but is not limited to these types of memories and any memory of another proper type.

In another form of this embodiment, a computer-readable storage medium is provided. The computer-readable storage medium stores an instruction. When the instruction is executed, a program instruction in any one of the foregoing methods is executed.

In another form of this embodiment, a computer program product including an instruction is provided. When the computer program product is run on a computer, the computer is enabled to perform any one of the foregoing methods.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. The term "at least one of the following items (pieces)" or an expression similar to the term indicates any combination of the items, and includes a single item (piece) or any combination of a plurality of items (pieces). For example, at least one of a, b, or c may indicate: a, b, c, a-b, a-c, b-c, or a-b-c, where a, b, and c may be singular or plural.

It should be understood that "one embodiment" or "an embodiment" mentioned in the entire specification does not mean that particular features, structures, or characteristics related to the embodiment are included in at least one embodiment of the present invention. Therefore, "in one embodiment" or "in an embodiment" appearing throughout the entire specification does not necessarily refer to a same embodiment. In addition, these particular characteristics, structures, or features may be combined in one or more embodiments in any appropriate manner. It should be understood that sequence numbers of the foregoing processes do not mean execution sequences in the embodiments of the present invention. The execution sequences of the processes should be determined based on functions and internal logic of the processes, and should not constitute any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to a signal having one or more data packets (for example, data from two components interacting with another component in a local system, a distributed system, and/or across a network such as the internet interacting with another system by using a signal).

It should be further understood that "first", "second", and various numerical symbols in this specification are merely used for distinguishing for ease of description, and are not used to limit a scope of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located at one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing description describes merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data communications method, comprising:
   receiving from an access point, by a first station, time adjustment information indicating a sending time point at which a signal is to be sent using each of at least two beams, the at least two beams corresponding to at least one station, and the first station is one of the at least one station, wherein the time adjustment information comprises a time offset of the sending time point at which the signal is sent using a first beam in the at least two beams relative to a preset time point, and a time offset of the sending time point of each beam in the least two beams, other than the first beam, relative to the sending time point of the first beam; and
   sending to the access point, by the first station based on the time adjustment information, data using a beam that belongs to the first station and that is in the at least two beams.

2. The method according to claim 1, wherein the time adjustment information comprises a time offset of a sending time point at which a second station in the at least one station sends a second signal relative to the preset time point, and a time offset of the sending time point at which the second signal is sent by using each of the at least two beams relative to the sending time point at which the second station sends the second signal.

3. The method according to claim 1, wherein the method further comprises:
   receiving from the access point, by the first station, first configuration information indicating the at least two beams;
   receiving from the access point, by the first station, second configuration information used to trigger the first station to send a reference signal; and
   sending to the access point, by the first station, the reference signal based on the second configuration information using the beam that is in the at least two beams and that belongs to the first station, wherein the reference signal is used by the access point to determine sending time points at which signals are to be sent using the at least two beams.

4. A data communications method, comprising:
   sending, by an access point, time adjustment information to at least one station, wherein the time adjustment information indicates a sending time point at which a signal is scheduled to be sent using each of at least two beams corresponding to a first station of the at least one station, wherein the time adjustment information comprises a time offset of the sending time point at which the signal is sent using a first beam in the at least two beams relative to a preset time point, and a time offset of the sending time point of each beam in the least two beams, other than the first beam, relative to the sending time point of the first beam; and
   receiving, by the access point, data sent by the first station based on the time adjustment information using the at least two beams.

5. The method according to claim 4, wherein the time adjustment information comprises a second time offset of a sending time point at which a second station in the at least one station sends a second signal relative to the preset time point, and a time offset of the sending time point at which the second signal is sent by using each of the at least two beams relative to the sending time point at which the second station sends the second signal.

6. The method according to claim 4, wherein the method further comprises:
   sending, by the access point, first configuration information indicating the at least two beams;
   sending, by the access point, second configuration information used to trigger a station to send a reference signal;
   receiving, by the access point, the reference signal; and
   determining, by the access point based on the reference signal, sending time points at which signals are to be sent using the at least two beams.

7. A data communications apparatus on a first station side, comprising:
- a transceiver;
- a memory comprising computer-executable instructions; and
- one or more processors in communication with the transceiver and the memory, wherein the instructions, when executed by the one or more processors, carry out a method comprising:
- receiving from an access point, time adjustment information indicating a sending time point at which a signal is to be sent using each of at least two beams, the at least two beams corresponding to at least one station, and the first station is one of the at least one station, wherein the time adjustment information comprises a time offset of the sending time point at which the signal is sent using a first beam in the at least two beams relative to a preset time point, and a time offset of the sending time point of each beam in the least two beams, other than the first beam, relative to the sending time point of the first beam; and
- processing, based on the time adjustment information, to control the transceiver to send data using a beam that belongs to the first station and that is in the at least two beams.

8. The apparatus according to claim 7, wherein the time adjustment information comprises a time offset of a sending time point at which a second station in the at least one station sends a second signal relative to the preset time point, and a time offset of the sending time point at which the second signal is sent by using each of the at least two beams relative to the sending time point at which the second station sends the second signal.

9. The apparatus according to claim 7, wherein the transceiver is further configured to:
- receive from the access point first configuration information used to indicate the at least two beams; and
- receive from the access point second configuration information used to trigger the first station to send a reference signal; and
- wherein the method carried out by the one or more processors when executing the instructions further comprises controlling, based on the second configuration information, the transceiver to send to the access point the reference signal using a beam that belongs to the first station and that is in the at least two beams, wherein the reference signal is used by the access point to determine sending time points at which signals can be sent by using the at least two beams.

* * * * *